(12) United States Patent
Power et al.

(10) Patent No.: US 8,375,809 B2
(45) Date of Patent: Feb. 19, 2013

(54) LOAD MONITORING FOR ELECTROMECHANICAL SYSTEMS

(75) Inventors: Terrill G. Power, Cherry Valley, IL (US); David Everett Russ, Rockford, IL (US); David G. Hill, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 244 days.

(21) Appl. No.: 12/715,609

(22) Filed: Mar. 2, 2010

(65) Prior Publication Data

US 2011/0214514 A1    Sep. 8, 2011

(51) Int. Cl.
*G01L 3/02* (2006.01)

(52) U.S. Cl. .................. 73/862.325; 73/862.08

(58) Field of Classification Search .............. 73/862.08, 73/862.11, 862.325
See application file for complete search history.

(56) References Cited

U.S. PATENT DOCUMENTS

| | | | |
|---|---|---|---|
| 3,982,419 A * | 9/1976 | Boys ......................... | 73/862.24 |
| 4,274,304 A * | 6/1981 | Curtiss ...................... | 475/270 |
| 4,392,098 A * | 7/1983 | Min .......................... | 318/758 |
| 4,419,619 A * | 12/1983 | Jindrick et al. ............. | 323/257 |
| 4,835,448 A | 5/1989 | Dishner et al. | |
| 4,849,666 A | 7/1989 | Hoag | |
| 4,874,053 A * | 10/1989 | Kimura et al. ............... | 180/443 |
| 5,029,659 A * | 7/1991 | Saito ........................ | 180/443 |
| 5,041,748 A | 8/1991 | Huber | |
| 5,398,780 A | 3/1995 | Althof et al. | |
| 5,918,836 A | 7/1999 | Russ | |
| 6,163,148 A * | 12/2000 | Takada et al. ............... | 324/226 |
| 6,279,673 B1 * | 8/2001 | Bohner et al. ............... | 180/167 |
| 6,370,470 B1 * | 4/2002 | Yamamura et al. ........... | 701/96 |
| 6,732,709 B1 * | 5/2004 | Havran et al. .............. | 123/406.24 |
| 6,978,686 B2 * | 12/2005 | Shimizu et al. .......... | 73/862.335 |
| 7,080,565 B2 * | 7/2006 | Delair et al. .............. | 73/862.325 |
| 7,448,220 B2 | 11/2008 | Schmidt et al. | |
| 7,999,498 B2 * | 8/2011 | Gotz et al. ................ | 318/400.02 |
| 2006/0176007 A1 * | 8/2006 | Best ........................ | 318/685 |

FOREIGN PATENT DOCUMENTS

JP        5107126 A       4/1993

* cited by examiner

*Primary Examiner* — Max Noori
(74) *Attorney, Agent, or Firm* — Cantor Colburn LLP

(57) ABSTRACT

A method for determining a load on a driven component of a rotating or stationary electromechanical system includes locating a rotationally flexible shaft portion in operable communication with a driving component having a drive rotor rotable about an axis and the driven component. The shaft portion is operably connected thereto. Angular positions of the drive rotor and the driven component are determined. A magnitude of a load on the driven component is calculated based on a difference in angular position of the drive rotor and the driven component and a known torsional rigidity of the shaft portion.

16 Claims, 5 Drawing Sheets

LOAD MONITORING FOR ELECTROMECHANICAL SYSTEMS

BACKGROUND OF THE INVENTION

The subject matter disclosed herein generally relates to electromechanical systems. More specifically, the subject disclosure relates to torque sensing in electromechanical systems.

With recent advances in electric motor and electric motor drive technology, it has become advantageous to replace the traditional mechanical, pneumatic and hydraulic systems on vehicles such as aircraft, spacecraft, ships and land vehicles with electrically driven systems. Electrically driven systems offer the advantages of greater efficiency, reduced weight, higher reliability, reduced environmental and fire hazard from hydraulic fluid, reduced maintenance cost and smaller packaging. In load carrying applications such as electromechanical actuators, starter-generators, electrically driven pumps, rotational torque in excess of safe design margins, or overload torque, can occasionally be applied to the system. Safety during an overload condition is of the utmost importance.

The need to sense the mechanical overload condition requires that the load be sensed and acted upon in an appropriate time frame to prevent mechanical or electrical damage to the system and the external surroundings. Typically, mechanical or electrical load/force sensors are used to protect drive systems. Adding sensors to an actuation system, however, reduces its reliability and increases the overall system complexity. Mechanical actuation systems require accurate mechanisms that allow relief of the mechanical loads that exceed a design threshold. Mechanical safety features such as shear shafts, brakes, slip clutches and load sensors have traditionally provided overload protection but have limitations. Similarly, hydraulic and pneumatic actuation systems typically utilize a spring loaded pressure relief valve that opens when the system pressure/system load exceeds the design threshold. The art would well receive an overload protection apparatus that provides accurate system protection without increasing complexity of the system or reducing the overall system reliability.

BRIEF DESCRIPTION OF THE INVENTION

According to one aspect of the invention, an electromechanical system includes a driving component having a drive rotor rotable about an axis and a driven component rotable about the axis. A rotationally flexible shaft portion is located in operable communication with the drive rotor and the driven component. The shaft portion is operably connected thereto such that rotation of the drive rotor about the axis drives rotation of the driven component about the axis. A difference in the amount of rotation of the drive rotor and the driven component is indicative of a load on the driven component.

According to another aspect of the invention, a method for determining a load on a driven component of an electromechanical system includes locating a rotationally flexible shaft portion in operable communication with a driving component having a drive rotor rotable about an axis and the driven component. The shaft portion is operably connected thereto. Angular positions of the drive rotor and the driven component are determined. A magnitude of a load on the driven component is calculated based on a difference in angular position of the drive rotor and the driven component and a known torsional rigidity of the shaft portion.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
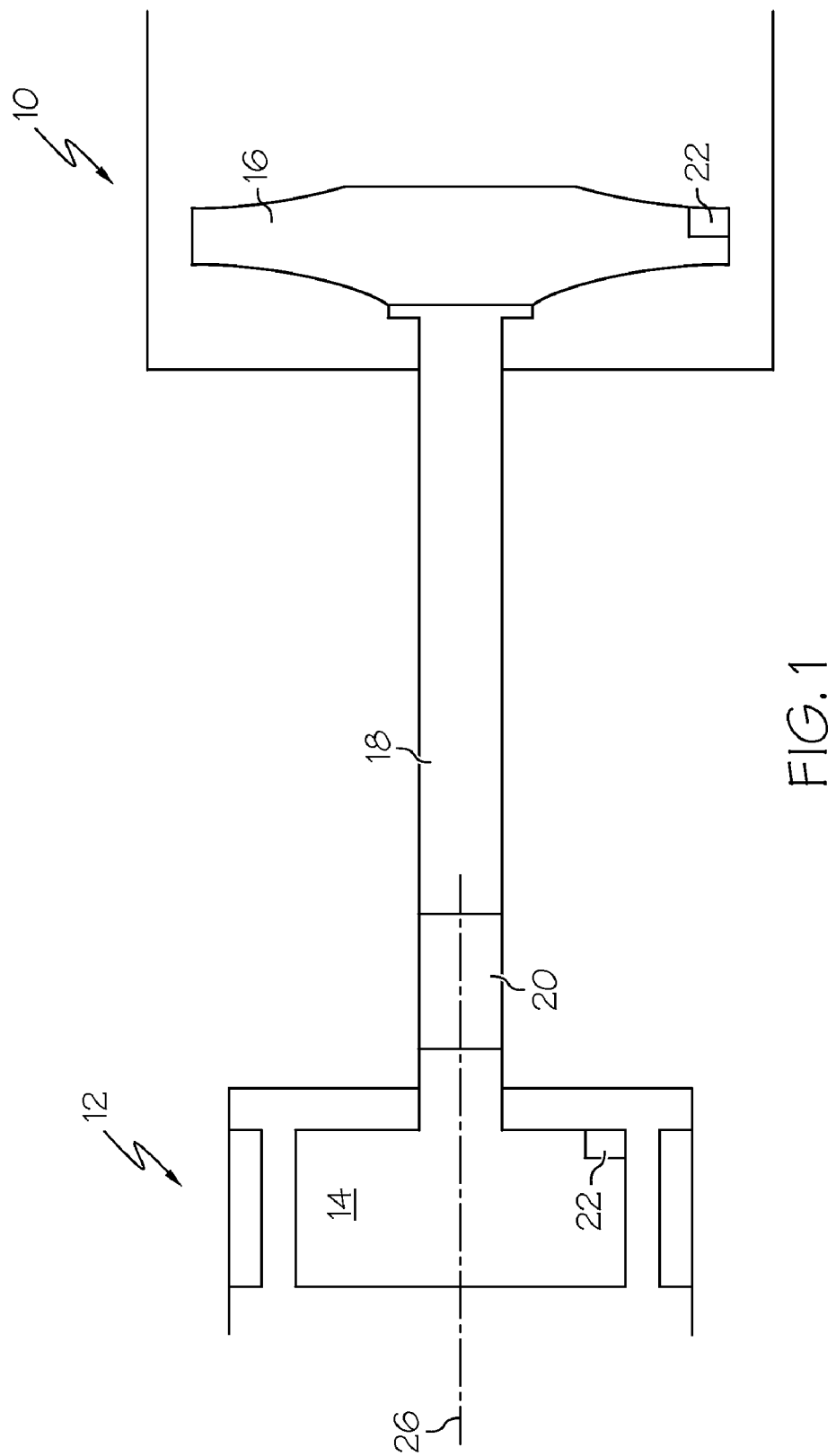
FIG. 1 is a schematic view of an embodiment of an electromechanical system.

Shown in FIG. 1 is an electromechanical system including a first component, for example, a turbine engine 10, and a second component, for example, a starter motor 12 for the turbine engine 10. In some embodiments, the starter motor 12 is an electrical motor. The starter motor 12 includes a starter rotor 14 which is connected to a turbine rotor 16 via a turbine shaft 18 extending between the starter rotor 14 and the turbine rotor 16. The turbine shaft 18 includes a rotationally flexible shaft portion 20 located between the starter rotor 14 and the turbine rotor 16.

The angular positions of both the turbine rotor 16 and the starter rotor 14 are known at any given time. To obtain the rotational position data, in some embodiments each of the starter motor 12 and the turbine engine 10 include at least one rotor position sensor 22 which is capable of detecting the angular position of the starter rotor 14 and the turbine rotor 16, respectively. In some embodiments, the starter motor 12 is a switched-reluctance (SR) motor, a brushless DC motor, inductance motor, or other motor which includes an existing rotor position sensor 22 used for commutation of the starter rotor 14. In some embodiments, other types of motors may be utilized, and a position sensor 22 such as, for example, a resolver, secured to a turbine shaft 18 to determine angular position of one or more of the starter rotor 14 or the turbine rotor 16. In other embodiments, a position of one of starter rotor 14 may be determined without the use of a rotor position sensor 22. In these embodiments, angular position of the starter rotor 14 is determined mathematically via an algorithm which utilizes a known profile of, for example, voltage distribution and/or current, as the starter rotor 14 rotates about an axis 26 of the starter motor 12. Because the voltage profile of the starter motor 12 is known as a function of angular position of the starter rotor 14, the angular position of the starter rotor 14 can then be determined by measuring the voltage and/or current at a desired point and comparing the measured values to the known profile.

Figure 2:
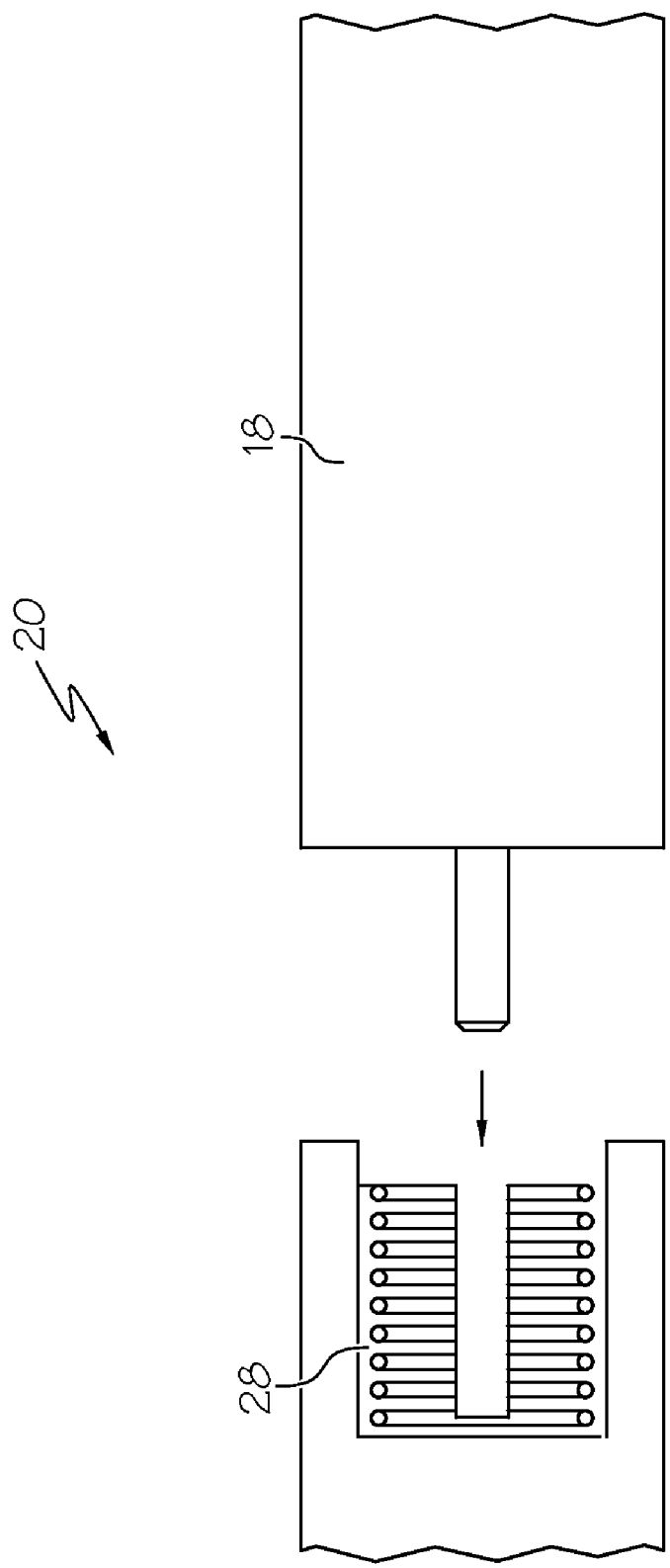
FIG. 2 is a cross sectional view of a portion of an embodiment of an electromechanical system.

The rotationally flexible shaft portion 20 is located along the turbine shaft 18 between the starter rotor 14 and the turbine rotor 16, in some embodiments between two rotationally rigid portions of the turbine shaft 18. As shown in FIG. 2, in some embodiments, the shaft portion 20 is a torsional spring 28 connected to the turbine shaft 18. The torsional spring 28 has a known spring constant or amount of twist per unit of force applied to it. While a torsional spring 28 is shown in FIG. 2 as the shaft portion 20, it is to be appreciated that other configurations of shaft portions 20 with a known amount of rotational flex, or twist, per unit of applied force may be utilized. For example, the shaft portion 20 may be a solid shaft with a known amount of rotation flex per unit of applied force.

Referring again to FIG. 1, knowing the angular position of both the starter rotor 14 and the turbine rotor 16 and the spring constant of the shaft portion 20 establishes a nominal relationship between rotation of the starter rotor 14 and the turbine rotor 16, such that for any rotational position of the starter rotor 14, a nominal position of the turbine rotor 16 can be understood. Such an arrangement can be useful in many situations. For example, knowing the position of the start rotor 14 and the turbine rotor 16 as well as the spring constant of the shaft portion 20, a load of the turbine engine 10 can be determined. Further, the arrangement may be utilized for health monitoring of the turbine engine 10. By sampling the starter rotor 14 position and the turbine rotor 16 position at the same time, a delta position can be calculated. Since there is a known spring constant between the starter rotor 14 and the turbine rotor 16, then the torque load of the turbine engine 10 can be determined. If the torque load falls outside of the nominal for the given operating conditions (temperature, air density, etc.) then maintenance on the turbine engine 10 may be warranted.

Figure 3:
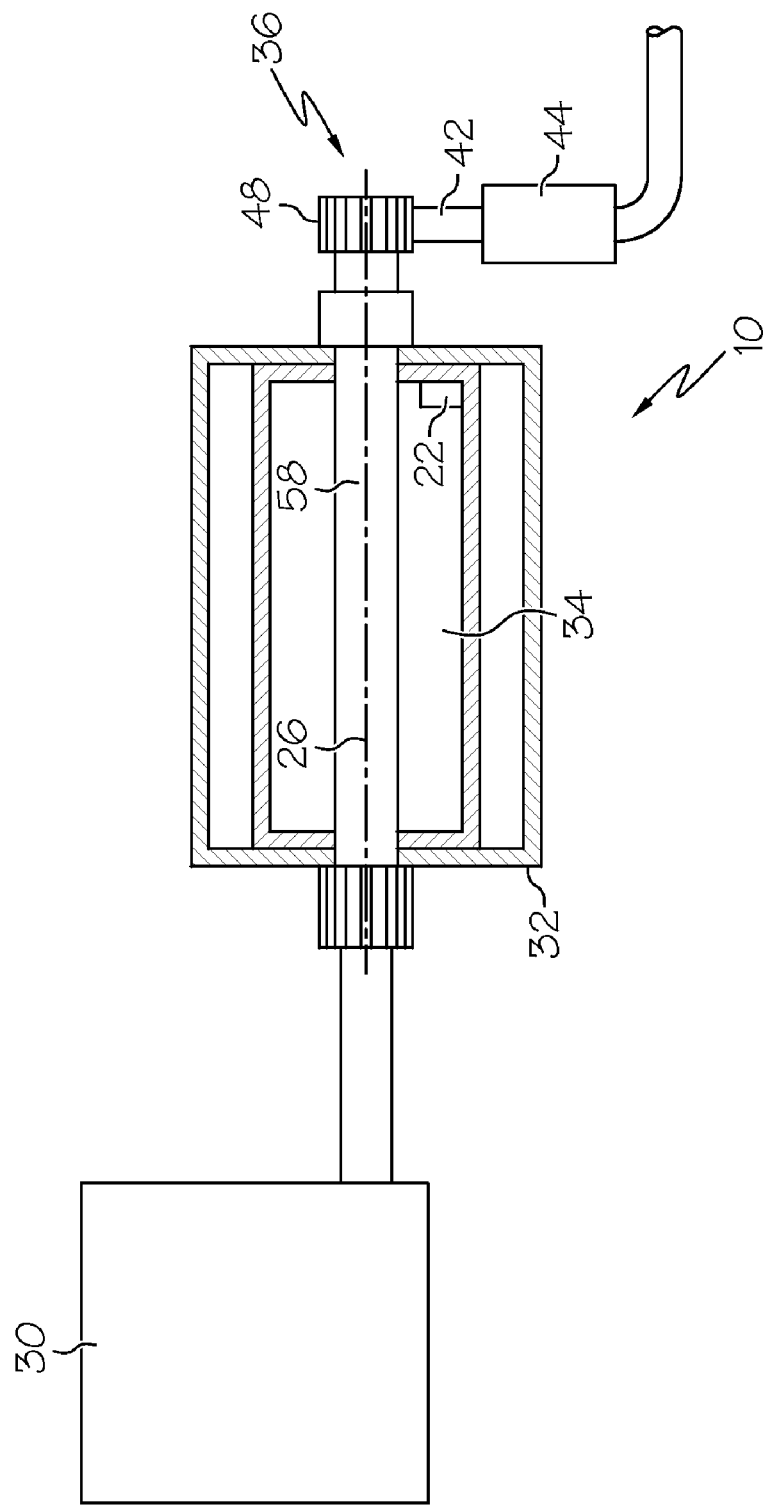
FIG. 3 is a schematic view of another embodiment of an electromechanical system.

Shown in FIG. 3 is another embodiment of an electromechanical system. In this embodiment, the first component is, for example, an electromechanical actuator 30, which is in some embodiments linear or rotational, which is connected to a drive motor 32 and driven thereby. The drive motor 32 includes at least one rotor position sensor 22 which is capable of detecting an angular position of a drive motor rotor 34 of the drive motor 32.

Figure 4:
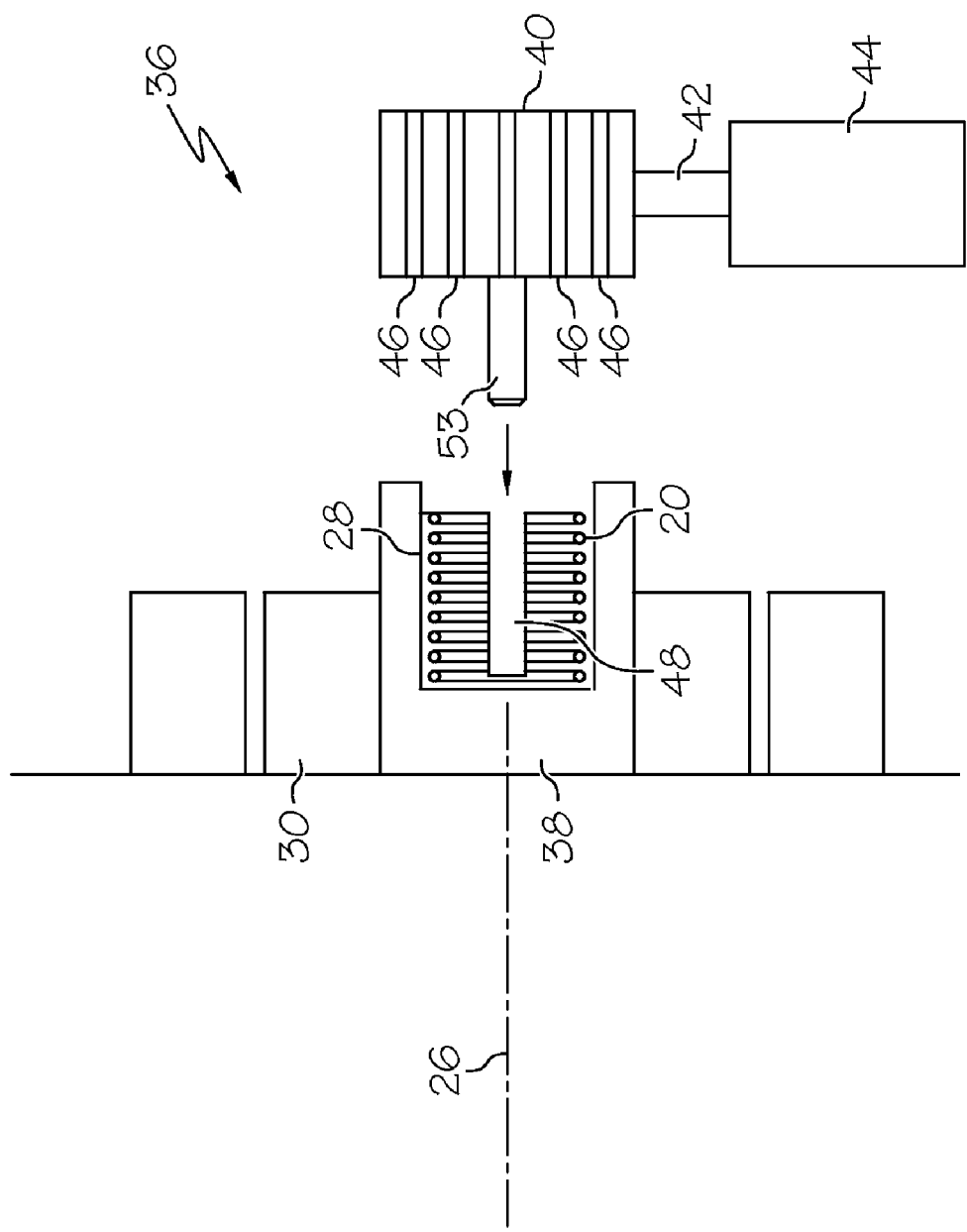
FIG. 4 is a cross-sectional view of a portion of an electromechanical system.

The electromechanical system includes a brake mechanism 36 located at one end of a motor shaft 38. As shown in FIG. 4, in some embodiments, the brake mechanism 36 includes a braking gear 40 affixed to the motor shaft 38 and a ratcheting pawl 42 attached to a ratcheting servo 44. The braking gear 40 includes a plurality of braking gear teeth 46 into which the ratcheting pawl 42 is engageable to stop rotation of the motor shaft 38 at a desired point thereby stopping actuation of the electromechanical actuator 30. While a ratcheting pawl and braking gear brake mechanism 36 is described herein, it is to be appreciated that embodiments including other types of braking mechanisms 36 are within the scope of the present disclosure.

The motor shaft 38 includes a rotationally flexible shaft portion 20 located between drive motor 32 and the brake mechanism 36. As above, in some embodiments, the shaft portion 20 is a torsional spring 28 connected to the motor shaft 38. The torsional spring 28 has a known spring constant or amount of twist per unit of force applied to it. The torsional spring 28 has a keyway 48 which is receptive of a braking gear shaft 50. While a torsional spring 28 is shown in FIG. 4 as the shaft portion 20, it is to be appreciated that other configurations of shaft portions 20 may be utilized. For example, the shaft portion 20 may be a solid shaft with a known amount of rotation flex per unit of applied force.

Figure 5:
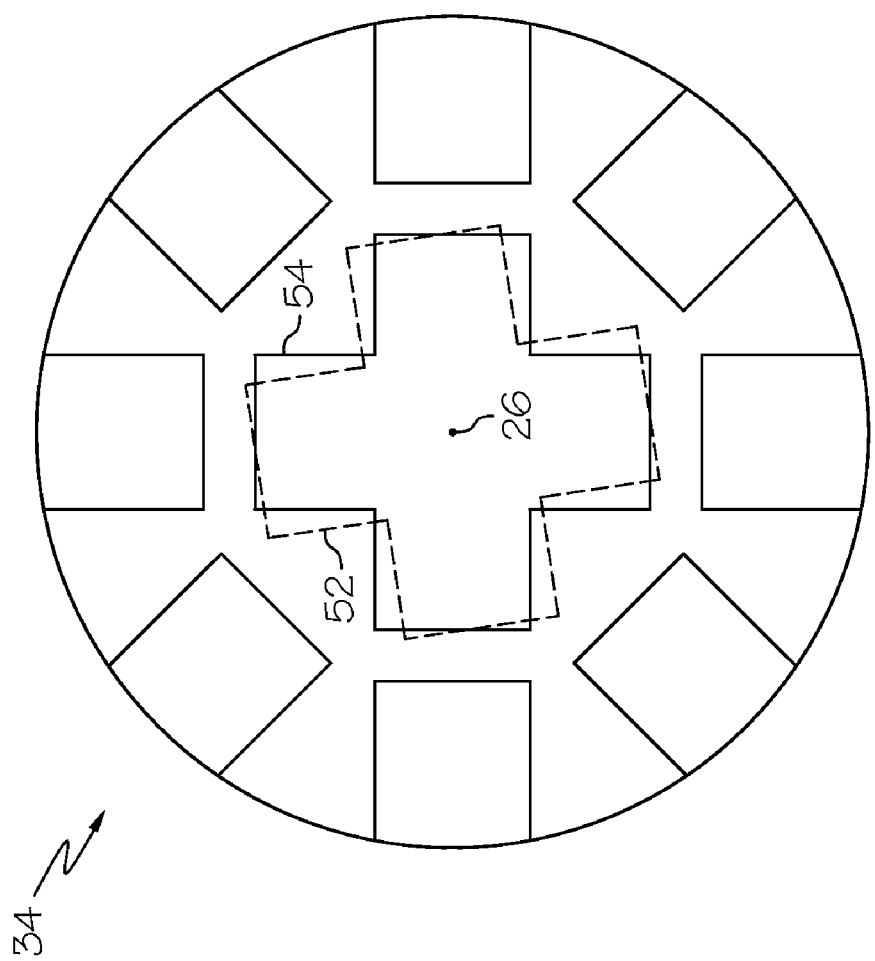
FIG. 5 is a schematic cross-sectional view illustrating torque applied to an embodiment of an electromechanical actuation system.

During operation of the electromechanical system, the drive motor 32 drives the electromechanical actuator 30 to a desired position via rotation of the motor shaft 38. The brake mechanism 36 is then engaged to stop rotation of the motor shaft 38. Due to forces acting on the electromechanical actuator 30, a torque may act on the motor shaft 38. This torque is monitored via the drive motor 32 having the shaft portion 20. Because of the presence of the shaft portion 20 having a known spring constant, torque applied to the motor shaft 38 while the brake mechanism 36 is engaged allows rotation of the drive motor rotor 34 and a non-flex portion 52 of the motor shaft 38. This rotation is illustrated in FIG. 5, showing the relative positions of an unloaded rotor 14a and a rotor position of a loaded rotor 14b. The movement of the rotor 14 is sensed by the position sensor 22, or by the sensing algorithm. Knowing the amount of rotational movement and the spring constant of the shaft portion 20 allows for the applied torque to be calculated. In some embodiments, the applied torque may have predetermined limits for electromechanical system integrity or safety reasons. If the applied torque exceeds the predetermined limit, the braking mechanism 36 may be released allowing rotation of the motor shaft 38 which in turn results in activation of the electromechanical actuator 30 such that the torque on the motor shaft 38 is relieved.

The electromechanical system having the shaft portion 20 and rotor position sensing either via a rotor position sensor 22 or other means, eliminates the need for a direct torque sensor in the electromechanical system 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electromechanical system comprising:
a driving component including an electrical motor having a drive rotor rotable about an axis;
a driven component rotable about the axis;
a rotational position sensor disposed at at least one of the drive rotor and the driven component to determine rotational position thereof, the rotational position sensor determining a rotational position of the drive rotor via a measured electrical property of the electrical motor; and
a rotationally flexible shaft portion disposed in operable communication with the drive rotor and the driven component and operably connected thereto such that rotation of the drive rotor about the axis drives rotation of the driven component about the axis, wherein a difference in the amount of rotation of the drive rotor and the driven component as determined by the rotational position sensor is indicative of a load on the driven component.

2. The electromechanical system of claim 1 wherein the driving component comprises one of a switched-reluctance (SR) motor, a brushless DC motor or an induction motor.

3. The electromechanical system of claim 1 wherein the shaft portion comprises a torsional spring having a known spring constant.

4. The electromechanical system of claim 1 further comprising a break mechanism configured to stop rotation of the drive rotor at a desired angular location.

5. The electromechanical system of claim 4 wherein the amount of rotation of the drive rotor when the braking mechanism is engaged is indicative of an amount of torque acting on the driving motor by the driven component.

6. The electromechanical system of claim 4 wherein the brake mechanism comprises:
   a brake gear operable connected to the shaft portion having a plurality of brake gear teeth; and
   a pawl engageable with the plurality of brake gear teeth.

7. The electromechanical actuation system of claim 6 wherein the pawl is ratchetable.

8. A method for determining a load on a driven component of an electromechanical system comprising:
   disposing a rotationally flexible shaft portion in operable communication with a driving component including an electrical motor having a drive rotor rotable about an axis and the driven component, the shaft portion operably connected thereto;
   determining an angular position of the drive rotor via a measured electrical property of the electrical motor;
   determining an angular position of the driven component, the angular position of at least one of the drive rotor and the driven component determined via a rotational position sensor disposed thereat; and
   calculating a magnitude of a load on the driven component based on a difference in angular position of the drive rotor and the driven component and a known torsional rigidity of the shaft portion.

9. The method of claim 8 wherein determining an angular position of the drive rotor is accomplished by comparing the measured electrical property of the electrical motor to a known profile.

10. The method of claim 9 wherein the electrical property is voltage and/or current.

11. The method of claim 8 further comprising comparing the load to a predetermined limit.

12. The method of claim 8 further comprising:
    engaging a braking mechanism to stop rotation of the drive rotor;
    changing an angular position of the drive rotor via a torque applied to the drive rotor via the driven component; and
    calculating a magnitude of the torque via a magnitude of change in the angular position of the drive rotor and the known torsional rigidity of the shaft portion.

13. The method of claim 12 further comprising relieving the torque from the driving component if the magnitude of the torque exceeds a predetermined limit.

14. The method of claim 13 wherein the torque is relieved by releasing the braking mechanism.

15. The method of claim 12 wherein engaging the brake mechanism comprises engaging a pawl into a plurality of brake gear teeth disposed in a brake gear.

16. The method of claim 8 wherein the driving component comprises one of a switched-reluctance (SR) motor, a brushless DC motor or an induction motor.

* * * * *